Figure 1:
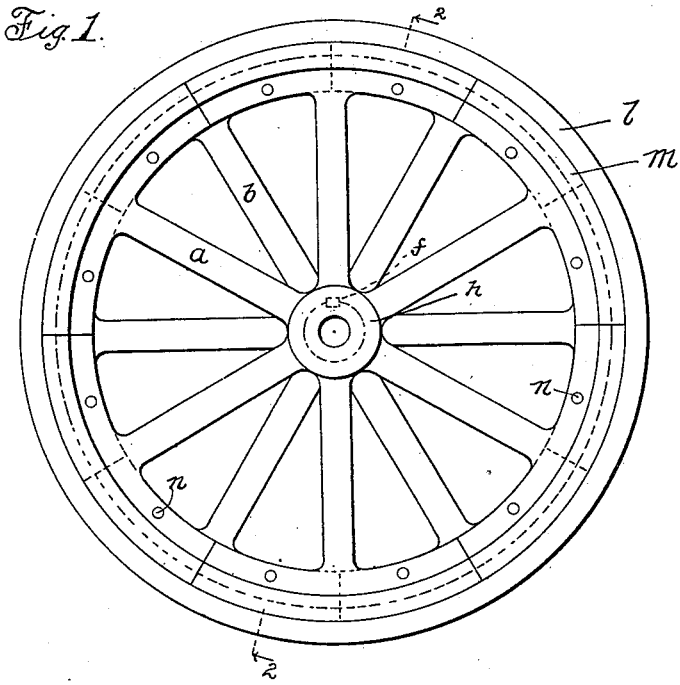

No. 669,125. Patented Mar. 5, 1901.
R. A. SCHWENKE.
VEHICLE WHEEL.
(Application filed Dec. 9, 1899.)

(No Model.)

Witnesses:
Max Zabel.
C. E. Stuert.

Inventor:
Robert Adolph Schwenke,
By Charles A. Brown & Cragg
Attorneys.

THE NORRIS PETERS CO., PHOTO-LITHO., WASHINGTON, D. C.

UNITED STATES PATENT OFFICE.

ROBERT ADOLPH SCHWENKE, OF BERLIN, GERMANY, ASSIGNOR TO THE SIEMENS & HALSKE ELECTRIC COMPANY, OF CHICAGO, ILLINOIS.

VEHICLE-WHEEL.

SPECIFICATION forming part of Letters Patent No. 669,125, dated March 5, 1901.

Application filed December 9, 1899. Serial No. 739,758. (No model.)

*To all whom it may concern:*

Be it known that I, ROBERT ADOLPH SCHWENKE, a subject of the German Emperor, residing at Berlin, in the Empire of Germany, have invented a certain new and useful Improvement in Vehicle - Wheels, (Case No. 297,) of which the following is a full, clear, concise, and exact description, reference being had to the accompanying drawings, forming a part of this specification.

My invention relates to vehicle-wheels, and more particularly to that class of vehicle-wheels employed in the construction of automobiles, and has for its object the provision of improved means for retaining separately-formed tire or tread portions in place.

In accordance with my invention I provide a groove in the rim of the body portion or support of the wheel and insert within this groove the tire or tread portion, which may be made of wood or rubber. Difficulty has heretofore been experienced in retaining the tires of automobile-wheels in place, which difficulty is due mainly to the non-uniformity of the nature of the material, on account of which, with a groove of uniform width, it was impossible to secure the necessary binding engagement between all portions of those walls of the groove lying in the plane of the wheel and the tire. In accordance with my invention I form one or both of the said walls of the groove in sections forming sectors, and provide clamping means for securing these sectors in engagement with the tire independently of each other, so that the binding engagement between the walls of the groove and the tire within the groove may vary throughout the circumference of the wheel, according to the nature of the material of the tire.

In the preferred embodiment of my invention I form the spokes of the wheel of suitable metal, preferably steel, and form the walls of the groove lying in the plane of the wheel integrally or firmly mechanically unite the same with the spokes.

I am aware that it is old in the construction of car-wheels to provide the metal tire of the wheel with an interior dovetailed flange adapted to fit within a corresponding groove upon the spider or support of the wheel, one wall of the groove being in the form of an annulus separably united with the other; but in this prior construction there is no need for the peculiar adjustment required where tread portions made of wood, rubber, or other material having a larger coefficient of friction than metal are employed. Substances that have larger coefficients of friction than metal are employed for constructing tires for automobiles to give tractive force and to prevent the wheels from slipping upon smooth road-beds, especially when covered with snow. Tires constructed of such material are naturally subject to rapid deterioration, and by means of my invention may readily be removed when in poor condition. In some instances I have also constructed the tire portion in the form of sectors, so that an injured section of the tire could be removed and replaced by a perfect one.

I will explain my invention more particularly by reference to the accompanying drawings, in which—

Figure 2:
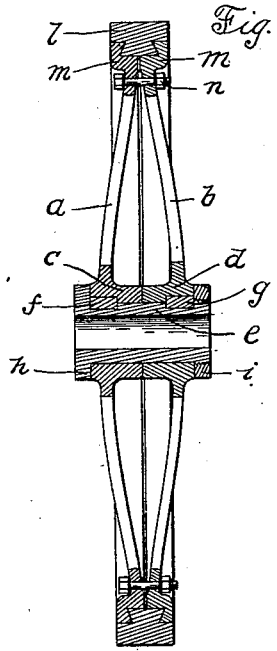
Figure 3:
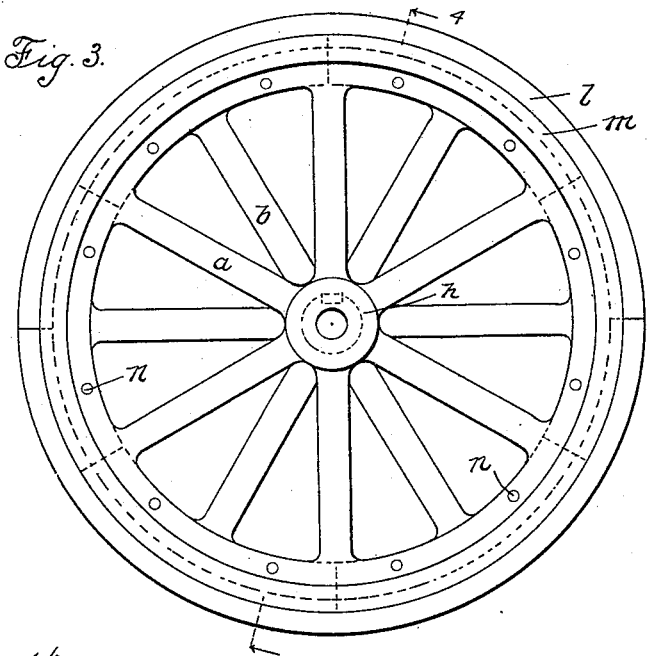

Figure 1 is a side elevation of a wheel constructed in accordance with my invention. Fig. 2 is a sectional view on line 2 2 of Fig. 1. Fig. 3 is a side elevation of a modified form of wheel constructed in accordance with the invention, and Fig. 4 is a sectional view on line 4 4 of Fig. 3.

Like parts are indicated by similar letters of reference throughout the different figures.

In the construction shown in Figs. 1 and 2 two sets of spokes $a$ and $b$ are employed, integrally united with collars $c$ and $d$ at the hub ends thereof, these collars being mounted upon the hub $e$, which is designed in this particular instance to rotate upon a fixed shaft. In assembling the spokes upon the hub a pin $f$ is first placed in position, being inserted within a corresponding groove in the hub, this pin projecting beyond the hub. The collar $c$, supporting the spokes $a$, is next slipped upon the hub, this collar having a recess or keyway which receives the projecting portion of the pin $f$, the pin thereby serving to prevent relative rotation between the spokes $a$ and the hub. Afterward the ring $d$, supporting the spokes $b$, is slipped upon the hub. A second key or pin $g$ is inserted within recesses provided in the hub and ring $d$, so as to prevent relative rotation between the spokes $b$ and the hub. The hub is provided with a shoulder $h$, engaging one end of the ring $c$, while a second shoulder $i$ is separably secured to the hub and engages one face of the ring $d$. The removable shoulder or annulus $i$ preferably has threaded engagement with the hub.

Figure 4:
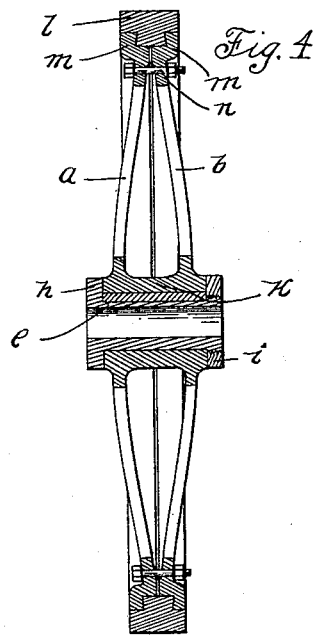

In the construction shown in Figs. 3 and 4 the spokes $a$ $b$ are supported at their hub ends upon a single sleeve $k$, provided with a keyway adapted to register with a keyway in the hub, a key serving to unite the spokes and hub to prevent relative rotation between the same. In each construction shown the spokes are separable at their outer ends. The walls $m$ $m$ of the groove for receiving the tire $l$ are carried upon the outer ends of the spokes. The groove for receiving the tire is preferably dovetailed, the engaging portion of the tire being correspondingly shaped. Both of these walls are preferably formed in sectors, each united with a single spoke at its middle portion. Where both walls are formed in sectors, the meeting edges between the sectors on one side of the wheel and the meeting edges between the sectors on the other side of the wheel preferably break joints. Fastening-bolts $n$ $n$ pass through the sectors on both sides of the tire, I preferably employing two bolts in connection with each sector, one upon each side of the spokes supporting the same.

In Fig. 3 I have shown one of the walls $m$ of the tire-receiving groove undivided into sections, the divisions of the wall upon the other side of the wheel being indicated by dotted lines. In this figure I have also shown the tire divided into sections in the form of sectors, the meeting edges between the sections of the tire breaking joint with the meeting edges between the sections of the divided wall $m$.

With the construction shown in Figs. 1 and 2 the tire may be removed by removing one set of spokes, as the spokes $b$, from the hub. With the construction shown in Figs. 3 and 4 the spokes supporting the divided wall $m$ should be elastic enough to permit of their separation and thereby the withdrawal in a radial direction of the tire.

One very important feature of my invention is the provision of two sets of spokes, constituting rim or tire supports, each carrying a wall of the recess for receiving the tire, these walls being separable, and I consider this construction to be new whether one or both of the walls of the groove are divided into sectors, the function of the sectors being to secure independent clamping engagement at different portions of the tire to compensate for irregularities of thickness and material. Where tires of uniform size and homogeneous throughout are constructed, it is obvious that certain advantages of my improved construction could be secured without the division of either of the walls of the tire-receiving groove into sectors.

It is obvious that changes may readily be made in the construction of my invention without departing from its spirit, and I do not therefore desire to be limited to the precise construction and arrangement of parts shown; but,

Having thus described my invention, I claim as new and desire to secure by Letters Patent—

1. In a vehicle-wheel, the combination with two sets of spokes, of a grooved rim carried at the outer ends of both sets of spokes, the said rim having two separable walls, each supported upon a set of spokes, means for preventing a relative displacement of the separable walls of the rim, a tire contained within the groove, and fastening means for uniting the walls of the groove, substantially as described.

2. In a vehicle-wheel, the combination with two sets of spokes, of a grooved rim carried at the outer ends of both sets of spokes, the said rim having two separable walls, each supported upon a set of spokes, means for preventing a relative displacement of the separable walls of the rim, a tire contained within the groove, and transverse bolts for uniting the walls of the groove, substantially as described.

3. In a vehicle-wheel, the combination with two sets of spokes, of a rim having a dovetailed groove carried at the outer ends of both sets of spokes, the said rim having two separable walls, each supported upon a set of spokes, means for preventing a relative displacement of the separable walls of the rim, a tire contained within the groove and having a dovetailed tongue or shoulder for engagement therewith, and fastening means for uniting the walls of the groove, substantially as described.

4. In a vehicle-wheel, the combination with two sets of spokes, of a rim having a dovetailed groove carried at the outer ends of both sets of spokes, the said rim having two separable walls, each supported upon a set of spokes, means for preventing a relative displacement of the separable walls of the rim, a tire contained within the groove and having a dovetailed tongue or shoulder for engagement therewith, and transverse bolts for uniting the walls of the groove, substantially as described.

5. In a vehicle-wheel, the combination with two sets of spokes, of a grooved rim upon the outer ends thereof, each set of spokes supporting a wall of the groove, the walls of the groove being separable, a tire contained within the groove, fastening means for securing the walls of the groove together, hub-supports one for each set of spokes, the said hub-supports being separable and a central hub within the said hub-supports, substantially as described.

6. In a vehicle-wheel, the combination with two sets of spokes, of a grooved rim carried upon the outer ends thereof, each set of spokes supporting a wall of the said groove, which walls are separable, a tire within the groove, fastening means for uniting the walls of the groove, a hub, a collar for each set of spokes adapted to be engaged with the hub, the said collars being separable, and means for uniting the said hub and collars to prevent relative rotation between the same, substantially as described.

7. In a vehicle-wheel, the combination with two sets of spokes, of a grooved rim carried at the outer ends of both sets of spokes, the said rim having two separable walls, each supported upon a set of spokes, a tire contained within the groove, fastening means for uniting the walls of the groove, one of the walls of the said groove being divided into separable sectors, the sectors being carried by the corresponding set of spokes, and means for preventing a relative displacement of the separable walls of the rim, substantially as described.

8. In a vehicle-wheel, the combination with two sets of spokes, of a grooved rim carried at the outer ends of both sets of spokes, the said rim having two separable walls, each supported upon a set of spokes, a tire contained within the groove, transverse bolts for uniting the walls of the groove, one of the walls of the said groove being divided into separable sectors, the sectors being carried by the corresponding set of spokes, and means for preventing a relative displacement of the separable walls of the rim, substantially as described.

9. In a vehicle-wheel, the combination with two sets of spokes, of a rim having a dovetailed groove carried at the outer ends of both sets of spokes, the said rim having two separable walls, each supported upon a set of spokes, a tire contained within the groove and having a dovetailed tongue or shoulder for engagement therewith, fastening means for uniting the walls of the groove, one of the walls of the said groove being divided into separable sectors, the sectors being carried by the corresponding set of spokes, and means for preventing a relative displacement of the separable walls of the rim, substantially as described.

10. In a vehicle-wheel, the combination with two sets of spokes, of a rim having a dovetailed groove carried at the outer ends of both sets of spokes, the said rim having two separable walls, each supported upon a set of spokes, a tire contained within the groove and having a dovetailed tongue or shoulder for engagement therewith, transverse bolts for uniting the walls of the groove, one of the walls of the said groove being divided into separable sectors, the sectors being carried by the corresponding set of spokes, and means for preventing a relative displacement of the separable walls of the rim, substantially as described.

11. In a vehicle-wheel, the combination with two sets of spokes, of a grooved rim upon the outer ends thereof, each set of spokes supporting a wall of the groove, the walls of the groove being separable, a tire contained within the groove, fastening means for securing the walls of the groove together, hub-supports one for each set of spokes, the said hub-supports being separable, one of the walls of the said groove being divided into separable sectors, the sectors being carried by the corresponding set of spokes, and a central hub arranged within the said hub-supports, substantially as described.

12. In a vehicle-wheel, the combination with two sets of spokes, of a grooved rim carried upon the outer ends thereof, each set of spokes supporting a wall of the said groove, which walls are separable, a tire within the groove, fastening means for uniting the walls of the groove, a hub, a collar for each set of spokes adapted to be engaged with the hub, the said collars being separable, and means for uniting the said hub and collars to prevent relative rotation between the same, one of the walls of the said groove being divided into separable sectors, the sectors being carried by the corresponding set of spokes, substantially as described.

13. In a vehicle-wheel, the combination with two sets of spokes, of a rim carried thereby, a groove being provided within the rim, a tire within the groove, the walls of the groove being separable and each carried upon a set of spokes, one of the said walls being divided into sectors, each sector being united at its middle portion with a spoke of a corresponding set, bolts passing transversely through each sector, one upon each side of the spoke supporting the same, the said bolts also passing through the wall of the groove opposed to the sectors, and means for preventing a relative displacement of the said separable walls of the rim, substantially as described.

14. In a vehicle-wheel, the combination with two sets of spokes, of a rim formed in two parts, each part being carried by a set of spokes, means for uniting the separable parts of the rim, and means for preventing a relative displacement of the separable walls of the rim, substantially as described.

In witness whereof I hereunto subscribe my name this 15th day of November, A. D. 1899.

ROBERT ADOLPH SCHWENKE.

Witnesses:
 WOLDEMAR HAUPT,
 HENRY HASPER.